Nov. 14, 1961   P. ROUMELIOTIS   3,008,678
DISPOSABLE DISH AND RELEASABLE HOLDER THEREFOR
Filed Jan. 6, 1960
FIG.3.
FIG.4.
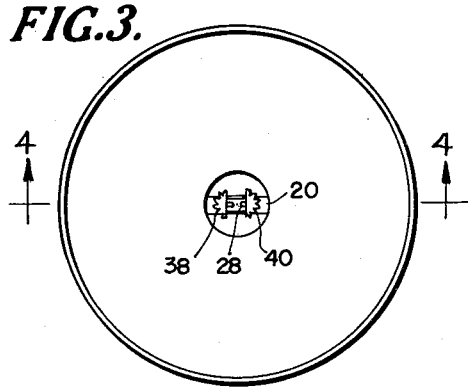
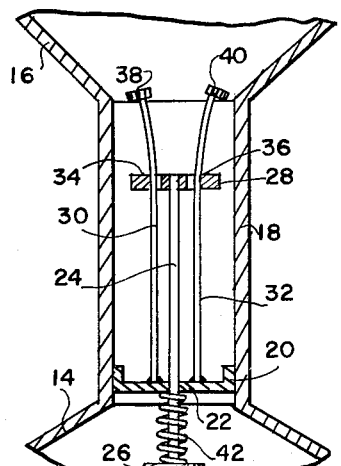
FIG.2.
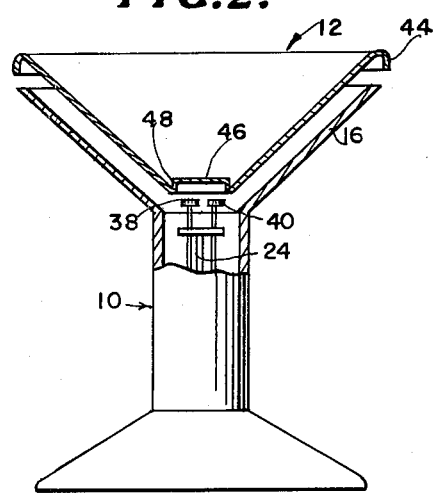
FIG.5.
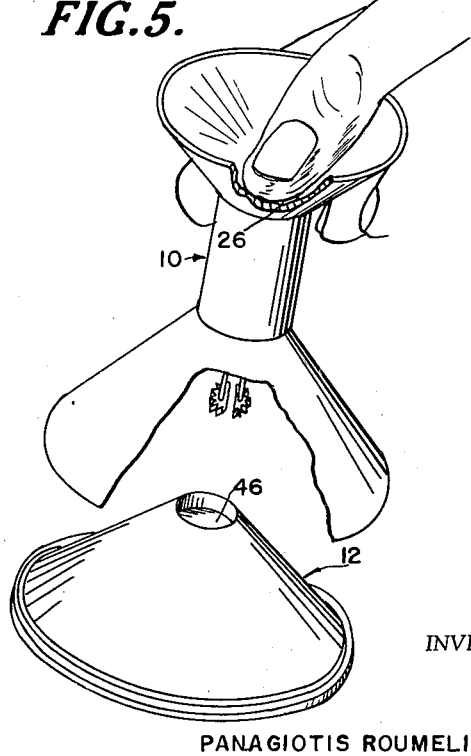
FIG.1.
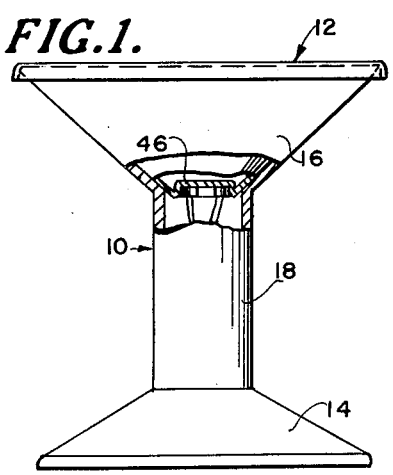
INVENTOR
PANAGIOTIS ROUMELIOTIS
BY
Cushman, Darby & Cushman
ATTORNEYS United States Patent Office 3,008,678
Patented Nov. 14, 1961

3,008,678
DISPOSABLE DISH AND RELEASABLE
HOLDER THEREFOR
Panagiotis Roumeliotis, 309 Thomas St., Bel Air, Md.
Filed Jan. 6, 1960, Ser. No. 752
7 Claims. (Cl. 248—145.3)

The present invention relates to disposable dishes and releasable holders therefor, and more particularly to the combination of a novel disposable dish and a releasable holder therefor having a unique gripping means for holding said dish.

While the concept of disposable dishes and releasable holders is not novel per se, most conventional holders and dishes are unsatisfactory in one respect or another. For example, with many of the conventional holders it is necessary to place the dish in the holder and remove it therefore by hand, thus impairing the sanitation of clean dishes and also making it messy for the operator when removing dirtied dishes. Other types of conventional holders, which can engage a dish without it being handled, have springs or the like for engaging the dish which do not result in a very strong or stable grip on the dish, and are often very difficult to use since, in some instances, it is necessary to rotate the holder several times upon the inverted dish to make the springs grab, or the dish otherwise becomes engaged therewith. Also with these holders it is necessary to remove the dirtied dish manually, which is of course quite messy, and not very quick. Furthermore, with many conventional holders there is no prevention of relative rotation between the holder and dish, and with some models if the dish does rotate the holding means releases its grip thereon.

It is, therefore, a primary object of the present invention to provide a disposable dish of novel design and a unique holder therefor, whereby the dish may be both mounted on said holder and removed therefrom without the operator having to manually handle the dish itself, thus making the device very sanitary to use.

It is another object of the present invention to provide a disposable dish and releasable holder therefor, whereby the dish may be quickly and conveniently mounted on the holder and held there firmly free from relative rotation or movement of any kind with respect to the holder, and then subsequently may be conveniently and quickly removed therefrom.

It is a further object of the present invention to provide a disposable dish and holder therefor comprising base means having dish supporting means thereon, a dish supported by said dish supporting means and having an upwardly extending recess in the bottom thereof, and releasable gripping means associated with said base means for gripping the side walls of said recess to hold said dish relative to said supporting means.

These and other objects of the present invention will become more apparent in consideration of the following specification, taken in conjunction with the accompanying drawings in which I have showed a preferred embodiment of my invention by way of example and wherein:

FIGURE 1 is a side elevational view with certain parts broken away and shown in section, of a dish and holder embodying the principles of the present invention;

FIGURE 2 is a side elevational view partly in section of the dish and holder shown in FIGURE 1, but with the dish partly removed from the holder;

FIGURE 3 is a top view of the holder shown in FIGURE 1, with the dish removed;

FIGURE 4 is a traverse sectional view of a gripping means embodying the principles of the present invention; and FIGURE 5 is a perspective view of the holder about to be engaged with a dish.

Referring more particularly to the drawings, FIGURE 1 illustrates a releasable holder 10 and a disposable dish 12 in assembled relationship. Holder 10 is of the usual general configuration, having a base portion 14, a dish supporting portion 16 and a hollow stem 18 disposed therebetween and formed integrally therewith. The broken away portion shows the novel manner in which the dish 12 is held in holder 10, as will be described. The holder 10 may be made of plastic, metal, or any other suitable material.

Referring to FIGURE 4, there is illustrated in detail an embodiment of the gripping means, embodying the principles of the present invention, which can be used with holder 10. Disposed within hollow stem 18 is cross member 20 having upwardly turned opposite end portions for engagement with the inner surface of stem 18 by means welding, soldering, gluing or any other suitable means. Cross member 20 is provided at its center with aperture 22 which receives therethrough a plunger 24. Plunger 24 is provided at its lower end with disk 26, and at its upper end is rigidly affixed to a guide member 28. Cross member 20 has affixed to its upper surface spring members 30 and 32 which extend upwardly and outwardly from the point at which they are affixed to cross member 20. Each of the spring members 30 and 32 is disposed in the same plane, as can be seen in FIGURE 3, and can be affixed at its lower end to cross member 20 also by means of welding, soldering, or other conventional means. Spring members 30 and 32 extend through apertures 34 and 36, respectively, in guide member 28, to a point just above the upper end of the stem 18, and are provided at their upper ends with serrated gripping elements 38 and 40, respectively. Disposed between disk 26 and the lower surface of cross member 20 is plunger spring 42 which urges the disk 26 and thereby plunger 24 in a downwardly direction.

It is the natural tendency of spring members 30 and 32 to spread apart, as shown in FIGURE 4, but they are restrained from so spreading by apertures 34 and 36, respectively, in guide member 28. Thus, it can be seen that as guide member 28 is displaced towards cross member 20, the spring members 30 and 32 and hence gripping elements 38 and 40 will be allowed to spread apart. On the other hand, when the guide member 28 is displaced away from cross member 20, or upwardly in FIGURE 4, it can be seen that gripping elements 38 and 40 will be urged or forced together by the action of apertures 34 and 36, respectively, on spring members 30 and 32. In actual operation, the guide member 28 is displaced by means of plunger 24 and disk 26. The gripping elements 38 and 40 are forced together by pressing disk 26 towards cross member 20, and upon release of the pressing force upon disk 26 the plunger spring 42 urges the disk and hence the plunger in the opposite direction to allow the gripping elements to spread apart. Plunger 24 is prevented from dropping downwardly through aperture 22 once spring 42 is relaxed because of the friction between the spring members 30 and 32 and guide member 28, which friction tends to hold the guide member from sliding down the spring members.

FIGURE 3 is a top view of the holder with the disposable dish removed therefrom and illustrates the gripping device from above. It can thus be seen that each of the gripping elements 38, 40 are of generally semi-circular shape, having ridges or serrations about the circular portion of the periphery thereof.

FIGURE 2 illustrates, in addition to the holder 10, the disposable dish 12. As can be seen, this dish is of generally conical configuration and is adapted to be supported throughout most of its surface by the inside conical surface of supporting member 16. At the upper periphery of dish 12 there is provided a downwardly turned rim 44 which extends over the upper edge of supporting member 16 when the dish is in place thereon to prevent food and other matter from spilling down between the dish and holder. At the apex of the conical dish is provided an upwardly extending recess 46 which is of circular cross-section having side walls 48. When the plunger 24 is displaced upwardly and the gripping elements 38 and 40 are brought together, as is shown in FIGURE 2, the dish may be supported snugly upon the holder. Then, by subsequently releasing the plunger, spring 42 will urge it downwardly to allow the gripping elements to expand and engage the side walls 48 of recess 46 to hold the dish in place, is clearly shown in the broken away portion of FIGURE 1.

The dish 12 may be made of any conventional material as for example waxed or otherwise waterproofed paper, which is most conventional, or it can be made of plastic or some other suitable material. Similarly, it may be manufactured in the conventional manner, as by folding a flat sheet of either paper or plastic into a cone and then forming the rim and recess 46 by means of a press or other conventional apparatus.

Referring to FIGURE 5, there is illustrated the manner in which the holder and dish may be actually utilized. As is conventional, the dishes 12 may be supplied in an inverted stack comprising a large number of dishes. When it is deseired to provide the holder 10 with a dish, it is simply picked up, as shown, in an inverted position, the plunger is depressed by pushing on disk 26, and then the holder is placed firmly down on the top of the stack of dishes. Disk 26 is then released and the gripping elements allowed to spread apart to grip the dish in recess 46 so that the holder may then be raised from the stack with the top dish thereof firmly held in place to then be used as desired. It can thus be seen that there is provided a releasable holder for conveniently and efficiently supporting and holding a dish whereby the dish never comes in contact with the operator's hands and thus remains sanitary. When the dish has been used it is a simple expedient to position the holder over a wastebasket in an inverted position and then depress disk 26 whereupon the dirtied or used dish will drop into the wastebasket. This disposable feature is believed quite unique in that it is not necessary to touch in any way the dirtied dish when it is desired to remove it from the holder as must be done in more conventional releasable holders Thus the operator need not get his hands dirtied by handling the dirtied dish.

It can now be seen that there has been described and illustrated a particular embodiment of a disposable dish and releasable holder therefor which meets all of the objects set forth above. While there has been illustrated and described a single practical embodiment of the invention, it is capable of variations and modifications without departing from the spirit of the invention, as will be appreciated.

For example, the invention is applicable to the supporting and holding of plates and cups, as well as dishes, and also to dishes, plates and cups which are necessarily disposable, but simply must be positively supported for some reason or another. In addition, a modification may be provided wherein the spring members are formed so as to extend upwardly towards each other, instead of away from each other, and wherein the gripping elements are provided with gripping surfaces on their inner faces, so that the device could be used to grip the outside of the terminal or apex end of a conventional conical dish. In such an embodiment the guide member would spread the gripping elements apart when the plunger was depressed, instead of forcing them together, to thereby enable the gripping elements to grip the outside of the terminal portion of a dish supported upon the holder.

Another modification could be obtained by an inversion of parts, whereby the guide member is fixed to the holder and the spring members, not the guide member, are raised and lowered by means of the plunger. The operation of the device in either of these modifications would, of course, be the same as that of the preferred embodiment illustrated.

I, therefore, do not wish to be limited to the details set forth but intend that the invention encompass all variations and modifications as come within the scope of the appended claims.

What I claim as new and desire to secure by Letters Patent is:

1. A holder for releasably holding disposable dishes, cups and the like comprising: base means; dish, cup and the like supporting means; a hollow stem disposed between said supporting means and said base means and formed integrally therewith; transversely movable releasable gripping means disposed within said hollow stem for gripping the lower terminal portion of said disposable dish, cup and the like; said gripping means having opposed curved gripping members; spring means urging said gripping members into engagement with said terminal portion; guide means for said gripping means disposed within said hollow stem; manually operated plunger means for moving said gripping means to grip and to release said dish, cup and the like; and supporting means for said gripping means and said plunger disposed within said hollow stem.

2. A disposable dish holder comprising a base at the lower end thereof, an upper dish supporting portion at the upper end thereof, an intermediate portion connecting the same, transversely movable gripping elements adjacent the lower end of the supporting portion for gripping the lower end of a dish by transverse movement to maintain the dish on the holder in predetermined position, and a longitudinally movable plunger, accessible for manual manipulation through the bottom of the base, operatively connected to the transversely movable gripping elements to move the same transversely to engage and disengage the dish upon longitudinal movement of the plunger.

3. A disposable dish holder in accordance with claim 2, adapted for cooperation with a dish having in its lower end portion an upwardly extending, downwardly facing recess, characterized in that the transversely movable gripping elements are positioned to be received within said recess and to be expanded and contracted transversely under the control of the operative connection with the longitudinally movable plunger to engage and disengage the side wall of the recess.

4. A disposable dish holder in accordance with claim 3 characterized in that said gripping elements are mounted upon spring members and are normally urged apart, outwardly into engagement with the side wall of the recess in the dish, and in that the plunger includes a connection with said spring members for moving them and the gripping elements inwardly toward each other for release of the dish.

5. A disposable dish holder in accordance with claim 2 in which the holder further comprises a transversely extending support in the intermediate portion thereof, through which the longitudinally movable plunger extends, a guide mounted on the upper end of the plunger, a pair of upwardly extending spring members mounted on the support, extending upwardly and being disposed in engagement with said guide and carrying said gripping elements at their upper ends, said spring members being biased to move the gripping elements transversely in one direction relative to each other, and the engagement between said guide and the spring members serving to move the latter and the gripping elements in the opposite direction upon longitudinal movement of the plunger.

6. A device in accordance with claim 5 in which the spring members are biased to move the gripping elements apart and movement of the guide moves them together.

7. A holder for releasably holding disposable dishes comprising a base, dish supporting means, a hollow intermediate portion between the supporting means and the base, transversely movable releasable gripping means disposed within the holder urged resiliently to a position to engage and grip the lower terminal portion of a dish mounted on the supporting means to hold it against inadvertent relative movement thereon, and a longitudinally movable plunger mounted in said intermediate portion for manual manipulation through the bottom of the base and operatively connected to said transversely movable gripping means to move the same transversely to disengage and release such a dish upon longitudinal movement of the plunger.

References Cited in the file of this patent

UNITED STATES PATENTS

| | | |
|---|---|---|
| 1,758,633 | Ward | May 13, 1930 |
| 2,872,067 | Gessner et al. | Feb. 3, 1959 |
| 2,910,219 | Bennett et al. | Oct. 27, 1959 |